United States Patent
Song et al.

(10) Patent No.: US 8,518,589 B2
(45) Date of Patent: Aug. 27, 2013

(54) FUEL CELL SYSTEM AND METHOD OF OPERATING THE SAME

(75) Inventors: Tae-won Song, Yongin-si (KR); Hee-young Sun, Yongin-si (KR); Duk-Jin Oh, Seoul (KR)

(73) Assignees: Samsung Electronics Co., Ltd., Suwon-si, Gyeonggi-do (KR); Samsung SDI Co., Ltd., Suwon-si, Gyeonggi-do (KR)

( * ) Notice: Subject to any disclaimer, the term of this patent is extended or adjusted under 35 U.S.C. 154(b) by 332 days.

(21) Appl. No.: 12/690,289

(22) Filed: Jan. 20, 2010

(65) Prior Publication Data

US 2010/0183933 A1    Jul. 22, 2010

(30) Foreign Application Priority Data

Jan. 22, 2009    (KR) .................. 10-2009-0005754

(51) Int. Cl.
*H01M 8/04*    (2006.01)

(52) U.S. Cl.
USPC ........................................................ 429/427

(58) Field of Classification Search
None
See application file for complete search history.

(56) References Cited

U.S. PATENT DOCUMENTS

| | | | |
|---|---|---|---|
| 2006/0046106 A1* | 3/2006 | Yu et al. ...................... | 429/13 |
| 2008/0038602 A1* | 2/2008 | Yu et al. ...................... | 429/22 |
| 2008/0280175 A1* | 11/2008 | Gurunathan et al. ......... | 429/23 |
| 2010/0035098 A1* | 2/2010 | Ramani et al. ............... | 429/13 |
| 2010/0104903 A1* | 4/2010 | Gummalla et al. ........... | 429/20 |

FOREIGN PATENT DOCUMENTS

| | | |
|---|---|---|
| JP | 10-144334 | 5/1998 |
| JP | 2007-179964 | 7/2007 |
| JP | 2008-140772 | 6/2008 |

\* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A fuel cell system in which a low open circuit voltage (OCV) is maintained in a start-up mode and in a shut-down mode, and a method of operating the same, the method including: supplying an anode off-gas and air to the cathode in an open circuit voltage state in a start-up mode and cutting off supply of the fuel gas to the cathode in a normal operating mode; and supplying the fuel gas and air to the cathode in a shut-down mode, and if a load is cut off, purging the cathode and the anode in the OCV state.

19 Claims, 7 Drawing Sheets

| OPERATING MODE | | START-UP | | | NORMAL | SHUT-DOWN | | |
|---|---|---|---|---|---|---|---|---|
| STEP | BEFORE OCV | OCV | INITIAL LOAD | LOAD | RATING LOAD | LOAD | END LOAD | OCV | PURGE |
| GAS SUPPLY — ANODE | H2 | H2 | H2 | H2 | H2 | H2 | H2 | H2 | N2 |
| GAS SUPPLY — CATHODE | H2 | AIR + H2 | AIR + H2 | AIR | AIR | AIR | AIR + H2 | AIR + H2 | N2 |

FUEL CELL SYSTEM AND METHOD OF OPERATING THE SAME

CROSS-REFERENCE TO RELATED APPLICATION

This application claims the benefit of Korean Patent Application No. 10-2009-0005754, filed on Jan. 22, 2009, in the Korean Intellectual Property Office, the disclosure of which is incorporated herein, by reference.

BACKGROUND

1. Field

The present disclosure relates to fuel cell systems and methods of operating the same, and more particularly, to fuel cell systems in which a low open circuit voltage (OCV) is maintained in a start-up mode and in a shut-down mode, and methods of operating the same.

2. Description of the Related Art

Fuel cells are a type of power generation device that produces electricity continuously, if a fuel is supplied thereto, and that directly convert chemical energy of the fuel into electrical energy, according to a chemical reaction. However, the voltage produced in one such fuel cell is generally not sufficient for practical use. Thus, a plurality of fuel cell units (unit cells) are connected in series, to form a stack. Each of the unit cells includes an anode, a cathode, an electrolyte membrane disposed therebetween, and a plates having channels to supply an oxidant and a hydrogen-containing fuel to the anode and the cathode, respectively. In the unit cells, a reverse reaction of water electrolysis is performed, via the electrolyte membrane, so that electricity is produced.

A direct current (DC) generated by a fuel cell can be supplied to a power conditioning system (PCS), so as to generate an alternating current (AC), which can then be supplied to a load. The PCS can include a DC/DC converter and/or a DC/AC inverter. The DC/DC converter boosts a voltage of the DC generated by the fuel cell, so as to be an appropriate voltage for a given load. The DC/AC inverter converts the voltage-boosted DC into AC.

Generally, when the fuel cell system operates under a rating load, a voltage generated by the unit cells is increased. Thus, a voltage input to the PCS is varied, and operating conditions of the PCS are accordingly varied. In this way, if the voltage input to the PCS is increased, and a gain of a closed circuit is increased, so that a phase margin is reduced and a stabilization of the PCS is lowered.

In particular, the PCS operates in the most unstable condition, at a high open circuit voltage (hereinafter referred to as an OCV) that is generated before a load is applied to the PCS. Also, since the OCV of a fuel cell stack, which is the sum of OCVs generated in respective unit cells, is a criterion for determining a maximum voltage of the PCS, if the OCV of the fuel cell stack is increased, operating voltages of the components of the PCS are increased. As such, the entire configuration of the PCS and an algorithm for controlling the PCS are more complicated.

SUMMARY

Provided are open circuit voltage (OCV) controlling apparatuses, to reduce an OCV during a start-up mode and in a shut-down mode.

Provided are fuel cell systems including an OCV controlling apparatus, in which a low OCV is maintained in a start-up mode and in a shut-down mode.

Provided are methods of operating a fuel cell system, in which a low OCV is maintained in a start-up mode and in a shut-down mode.

According to an aspect of the present teachings, provided is an OCV controlling apparatus to control the OCV of a stack including a plurality of stacked unit cells and having an anode side and a cathode side, the apparatus comprising: a first valve installed at an outlet of the anode, to supply an anode off-gas discharged from the anode to an inlet of the cathode or an inlet of a burner of a fuel cell system; a second valve installed between an outlet of the first valve and the inlet of the cathode, to control an amount of the anode off-gas that is mixed with air supplied to the cathode; and a control unit to control at least one of the first valve and the second valve during a start-up mode and in a shut-down mode, when the stack is in an OCV state, and to cut off the supply of the anode off-gas to the cathode, during a normal operating mode.

According to another aspect of the present invention, provided is an OCV controlling apparatus to control the OCV of a stack including a plurality of stacked unit cells and having an anode side and a cathode side, the apparatus comprising: a first valve installed at an outlet of the anode side, to adjust an internal pressure of an anode off-gas discharged from the anode side; a second valve and a third valve connected in series between an inlet of the anode side and an inlet of the cathode side, to control the amount of a fuel gas that is mixed with air supplied to the cathode side; and a control unit to control the first valve and the third valve, so as to mix the fuel gas with air supplied to the cathode side, during a start-up mode and in a shut-down mode, when the stack is in an OCV state, and to cut off the supply of the fuel gas during a normal operating mode. The second valve prevents back flow of the fuel gas and air from the cathode side.

According to another aspect of the present invention, provided is a fuel cell system comprising: a stack of unit cells having an anode side and a cathode side, to generate direct current (DC); an OCV controlling module comprising at least one valve installed between either an inlet or an outlet of the anode side and an inlet of the cathode side, to supply the fuel gas and air to the cathode side, during a start-up mode and in a shut-down mode, when the stack is in an OCV state; and a power conditioning system (PCS) to generate alternating current (AC) from the DC.

According to another aspect of the present invention, a method of operating the fuel cell system, comprising: supplying a fuel gas and air to the cathode side, during a start-up mode, when the stack is in an OCV state; cutting off supply of the fuel gas to the cathode side, during a normal operating mode; and supplying the fuel gas and air to the cathode during a shut-down mode, and if a load is cut off, purging the stack.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A through 8A and FIGS. 6B through 8B are graphs showing OCVs, according to concentrations of a fuel gas supplied to the fuel cell system of FIG. 1, and the amount of air and a fuel gas supplied in each case.

DETAILED DESCRIPTION

Reference will now be made in detail to the exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present teachings.

Figure 1:
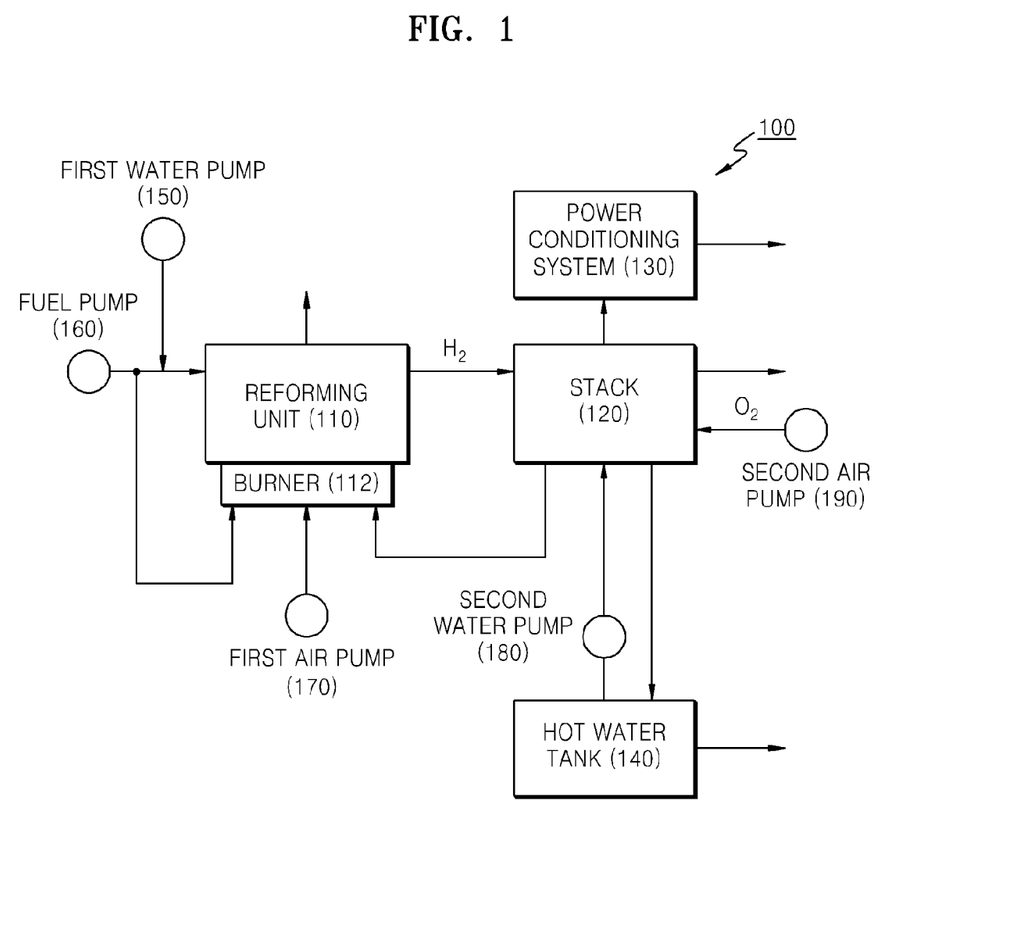
FIG. 1 is a block diagram of a fuel cell system to which a method of operating a fuel cell system is applied, according to an exemplary embodiment of the present teachings.

FIG. 1 is a block diagram of a fuel cell system 100, to which a method of operating a fuel cell system is applied, according to an exemplary embodiment of the present teachings. Referring to FIG. 1, the fuel cell system 100 includes: a reforming unit 110 that reforms a hydrocarbon-based fuel gas into hydrogen; a burner 112 that heats the reforming unit 110; a stack 120 that generates a direct current (DC) using the hydrogen gas supplied from the reforming unit 110; a power conditioning system (PCS) 130 that converts the DC generated by the stack 120 into an alternating current (AC); a hot water tank 140 that recovers and stores heat generated by the stack 120; a first water pump 150 that supplies water to the reforming unit 110; a fuel pump 160 that supplies a fuel such as city gas, liquefied petroleum gas (LPG), or kerosene, to the reforming unit 110 and/or the burner 112; a first air pump 170 that supplies air to the burner 112; a second water pump 180 that supplies water stored in the hot water tank 140 to the stack 120; and a second air pump 190 that supplies air (oxygen) to the stack 120. Meanwhile, although not shown, the fuel cell system 100 may further include a CO removing unit that adjusts the amount of carbon monoxide that is present in hydrogen gas generated by the reforming unit 110, and a desulfurizer that removes a sulfur component contained in the fuel. Similarly, although not shown, the fuel cell system 100 may further include a control unit that controls an overall operation of the fuel cell system 100.

Figure 2:
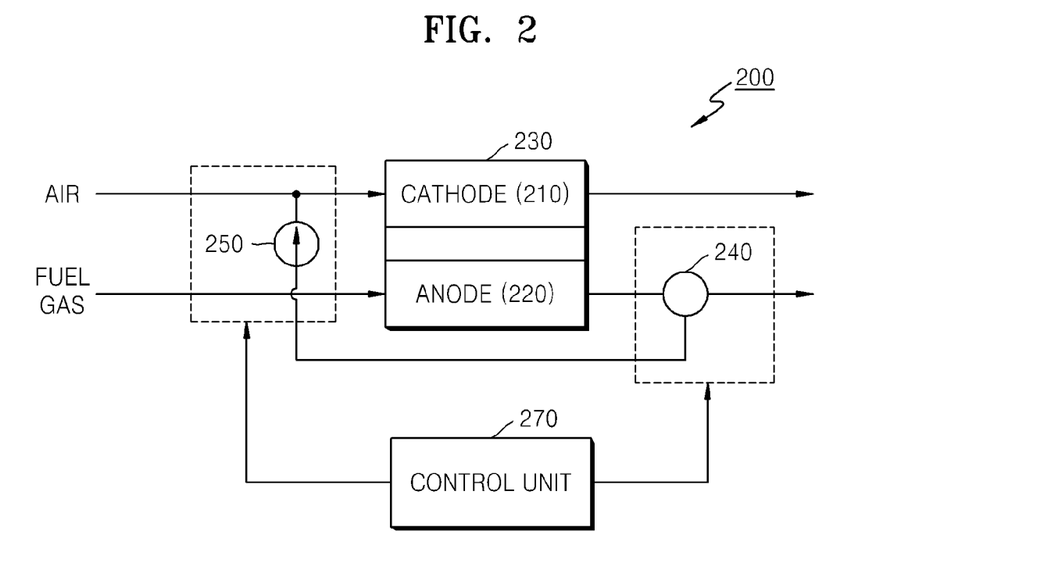
FIG. 2 is a block diagram of an open circuit voltage (OCV) controlling apparatus, according to an exemplary embodiment of the present teachings.

FIG. 2 is a block diagram of an open circuit voltage (OCV) controlling apparatus 200, according to an exemplary embodiment of the present teachings. Referring to FIG. 2, the OCV controlling apparatus 200 operates in conjunction with a fuel cell stack 230, and includes: a first valve 240; a second valve 250; and a control unit 270. The stack 230 includes a plurality of unit cells and has a cathode side 210 and an anode side 220. The cathode side 210 refers to a part of the stack 230 where fluids are exchanged with cathodes of the fuel cells, and the anode side 220 refers to a part of the stack 230 where fluids are exchanged with anodes of the fuel cells. Therefore, the cathode and anode sides 210, 220 are used for convenience of explanation and not limited to any particular portion of the stack 230.

The stack 230 produces electricity, according to an electrochemical reaction between air supplied to the cathode side 210 and a fuel gas supplied to the anode side 220, i.e., supplied to the anodes and the cathodes of the stack 230. The electricity is supplied to a load (not shown), via the PCS 130 (FIG. 1). Here, the fuel gas may be hydrogen, a reformate gas, or the like.

The first valve 240 is connected to an outlet of the anode side 220 and supplies anode off-gas discharged from the anode 220, i.e., un-reacted fuel gas, to an inlet of the cathode side 210, or to the burner 112 (FIG. 1) of the fuel cell system 100. The first valve 240 may be a 3-way valve having one inlet and two outlets.

The second valve 250 is installed between an outlet of the first valve 240 and the inlet of the cathode side 210. The fuel gas is fed from the first valve 240, through the second valve 250, and is then mixed with air that is then supplied to the cathode side 210. The second valve 250 may be a check valve that prevents backflow of the air and/or fuel. The second valve 250 may be automatically opened if a given fuel gas pressure is applied thereto.

The control unit 270 controls at least one of the first valve 240 and the second valve 250, so as to bleed the anode off-gas into the air supplied to the cathode side 210, during a start-up mode and a shut-down mode, when the stack 230 is in an OCV state or where an initial load or an end load is applied thereto. The initial load refers to a period when the load is initially applied, and the end load refers to a period just prior to the load being disconnected. The control unit controls the first valve to cut off the supply of the fuel gas to the cathode side 210, during a normal operating mode, for example, after a load has been applied for an initial amount of time. Subsequently, the fuel cell system 100 operates with the load, until the load is about to be cut off (end load begins). Here, conditions of each of the initial load and the end load may be set in advance.

In the start-up mode, the control unit 270 controls the first valve 240, while the stack 230 is in an OCV state, and after the temperature of the stack 230 reaches a given temperature, to mix the anode off-gas passing through the second valve 250, with air that is being supplied to the cathode side 210. During the normal operating mode, the control unit 270 controls the first valve 240 to supply the fuel gas (anode off-gas) discharged from the anode 220 to the burner 112. Also, during the shut-down mode, the control unit 270 controls the first valve 240, so that the anode off-gas may be mixed with the air, and supplied to the cathode 210.

Once the load is disconnected, the control unit 270 purges the stack 230, while the stack is in an OCV state. A fluid, such as nitrogen, may be used for the purging, but various other fluids may also be used. The control unit 270 may control the first valve 240, so as to supply the anode off-gas to the cathode side 210, or to cut off the supply of the anode off-gas to the cathode side 210, according to a signal applied from an external device, e.g., a fuel gas supply signal or a fuel gas cutoff signal, or according to on/off signals of a plurality of switches (not shown) that connect the fuel cell system 100 to a load (not shown), and according to a given supply time.

Figure 3:
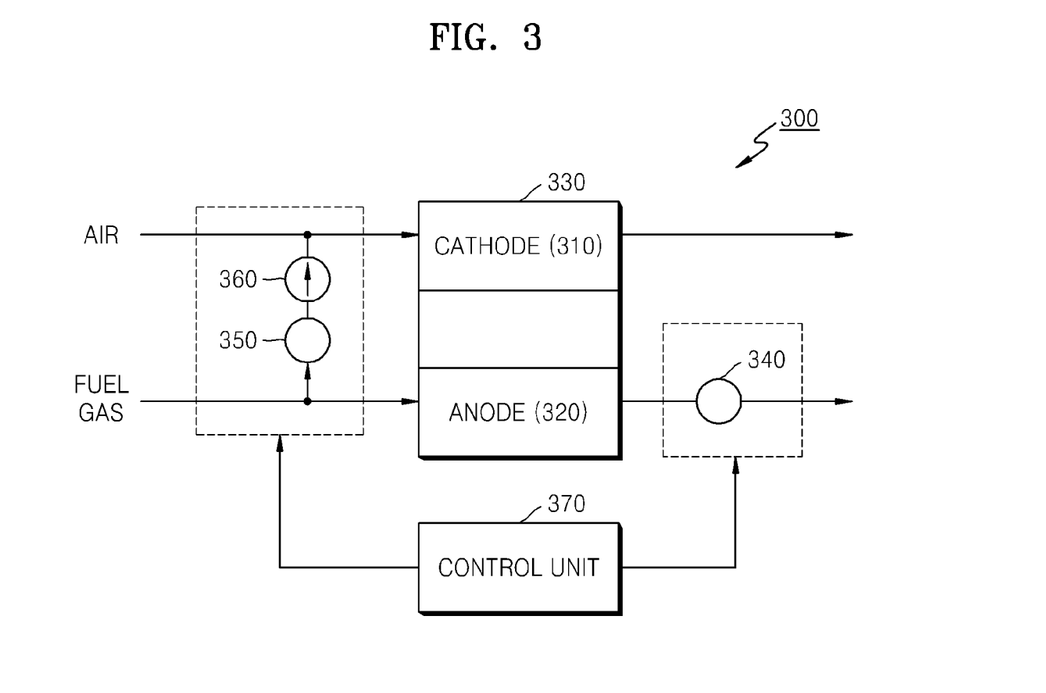
FIG. 3 is a block diagram of an OCV controlling apparatus, according to another exemplary embodiment of the present teachings.

FIG. 3 is a block diagram of an OCV controlling apparatus 300, according to another exemplary embodiment of the present teachings. Referring to FIG. 3, the OCV controlling apparatus 300 includes: a third valve 340; a fourth valve 350; a fifth valve 360; and a control unit 370. The apparatus 300 operates with a stack 330 of unit cells, and has a cathode side 310 and an anode side 320.

The stack 330 produces electricity, according to an electrochemical reaction of air supplied to the cathode side 310 and a fuel gas supplied to the anode side 320. The electricity is supplied to a load (not shown), via the PCS 130 (FIG. 1).

The third valve 340 is installed at an outlet of the anode side 320, has a variable cross-sectional area in a direction in which the fluid flows, and increases an internal pressure of the off-gas discharged from the anode side 320. The third valve 340 may be a proportional valve.

The fourth valve 350 and the fifth valve 360 are connected in series, between an inlet of the anode side 320 and an inlet of the cathode side 310. The fourth valve 350 may be an on/off valve to permit or block fluid flow. The fifth valve 360 may be a check valve to prevent back flow and may be automatically opened if a given fuel gas pressure is applied to the OCV controlling apparatus 300.

The control unit 370 controls the third valve 340 and the fourth valve 350, so as to add the fuel gas to air that is then supplied to the cathode side 310, during the start-up mode and in the shut-down mode, when the stack 330 is in an OCV state. The control unit 370 cuts off the supply of the fuel gas to the cathode side 310, during a normal operating mode, for example, after a load is initially applied.

In detail, during the start-up mode, an OCV state is entered, during which the control unit 370 partially closes the third valve 340, to increase the internal pressure of the anode side 320, and opens the fourth valve 350, to supply the fuel gas to the cathode side 310, via the fifth valve 360, so that the fuel gas is mixed with the air and supplied to the cathode side 310. On the other hand, in the normal operating mode, the control unit 370 closes the fourth valve 350 and completely opens the third valve 340, so that anode off-gas is discharged from the anode side 320 and supplied to the burner 112 of the fuel cell system 100. Also, in the shut-down mode, the control unit 370 partially closes the third valve 340, to increase the internal pressure of the anode side 220, and opens the fourth valve 350 to supply the fuel gas to the cathode side 310, via the fifth valve 360, so that the fuel gas is mixed with the air and supplied to the cathode side 310.

If the load is subsequently cut off, the control unit 370 purges the cathode side 310 and the anode side 320, while in the OCV state. Here, the control unit 370 may control the third valve 340 and the fourth valve 350, to supply the fuel gas to the cathode side 310, or to cut off the supply of the fuel gas to the cathode side 310, according to a signal applied from an external device, e.g., a fuel gas supply signal or a fuel gas cutoff signal, or according to on/off signals of a plurality of switches (not shown) that connect the fuel cell system 100 (FIG. 1) to a load (not shown), and according to a given supply time.

Figure 4:
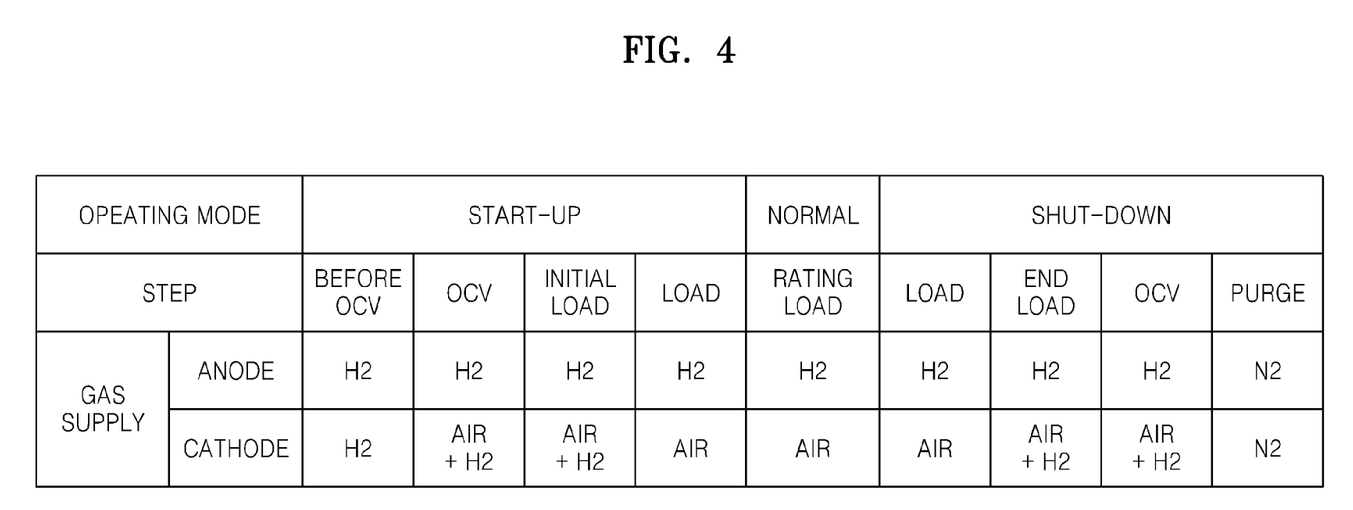
FIG. 4 is a table showing types of fluids to be supplied to an anode and a cathode in each of a start-up mode, a normal operating mode, and a shut-down mode of the fuel cell system of FIG. 1.

FIG. 4 is a table showing different types of fluids to be supplied to an anode side and a cathode side, during a start-up mode, a normal mode, and a shut-down mode of the fuel cell system 100. Referring to FIG. 4, during the start-up mode, an OCV state is produced, before a load is connected to the fuel cell system 100 (initial load). During the OCV state, air and a fuel gas (which may be an anode off-gas) are mixed and supplied to the cathode side 330. In the shut-down mode, air and the fuel gas are mixed and supplied to the cathode side 330, before the load is cut off (during end load), during the OCV state.

After the initial load operation, the supply of the fuel gas to the cathode side 310 is cut off. While in an OCV state, before the initial load is applied in the start-up mode, and before the end load is cut off in the shut-down mode, air and the fuel gas are mixed and supplied to the cathode side 310, so that a mixed potential may be formed and an OCV may be decreased. In this case, as the concentration of the supplied fuel gas, for example, concentration of hydrogen, increases the mixed potential is reduced, and the OCV is also decreased. Thus, a low OCV generated in the start-up mode is maintained, and the fuel cell system 100 may operate with the proper load.

Figure 5A:
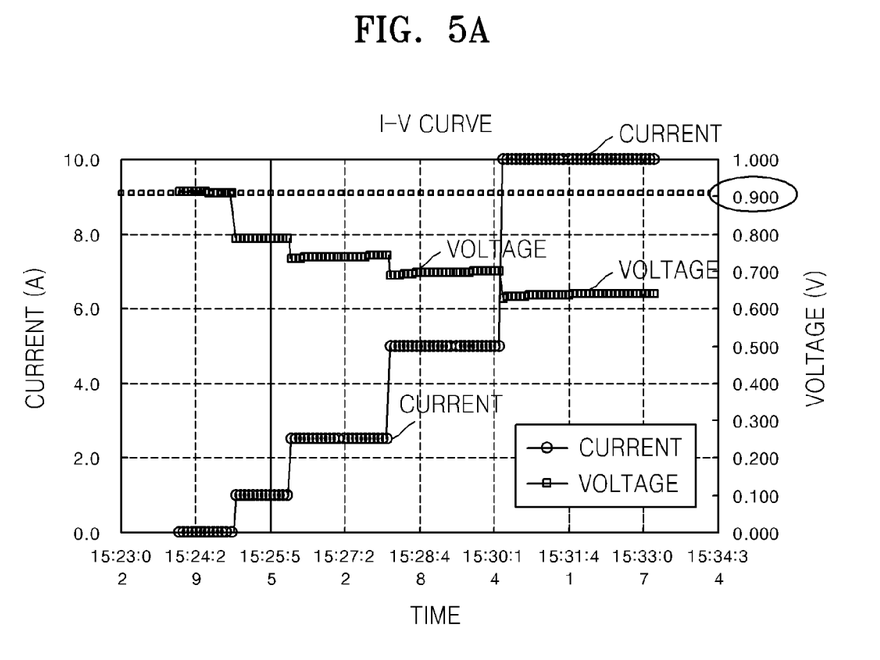
FIGS. 5A and 5B are graphs showing an OCV and the amount of air and a fuel gas supplied in a conventional fuel cell system.
Figure 5B:
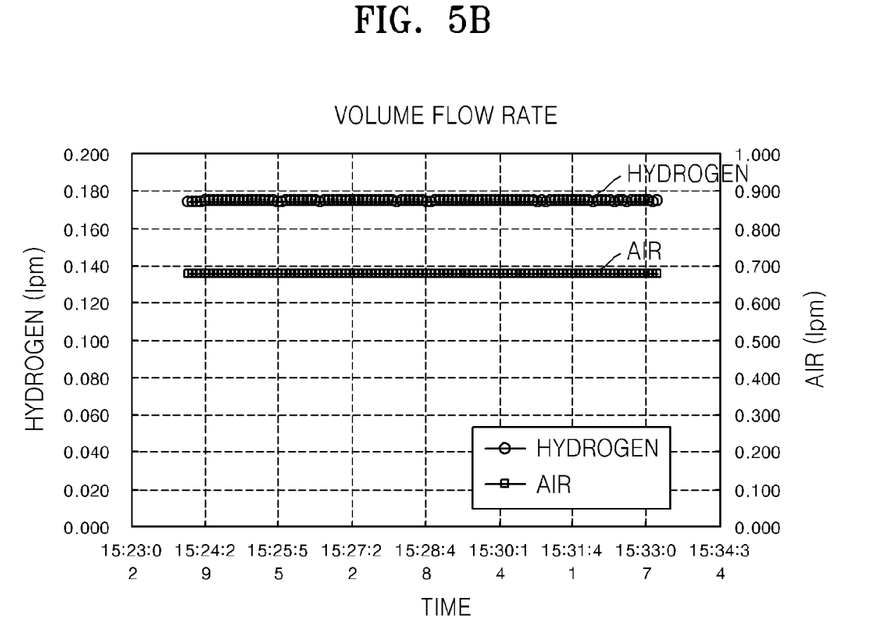

FIG. 5A is a graph showing an OCV in a conventional fuel cell system, and FIG. 5B is a graph showing the amount of air and a fuel gas supplied in the conventional fuel cell system. In a current-voltage graph of a unit cell in FIG. 5A, when air and the fuel gas are supplied to a stack, an OCV of 0.9 V is generated.

Figure 6A:
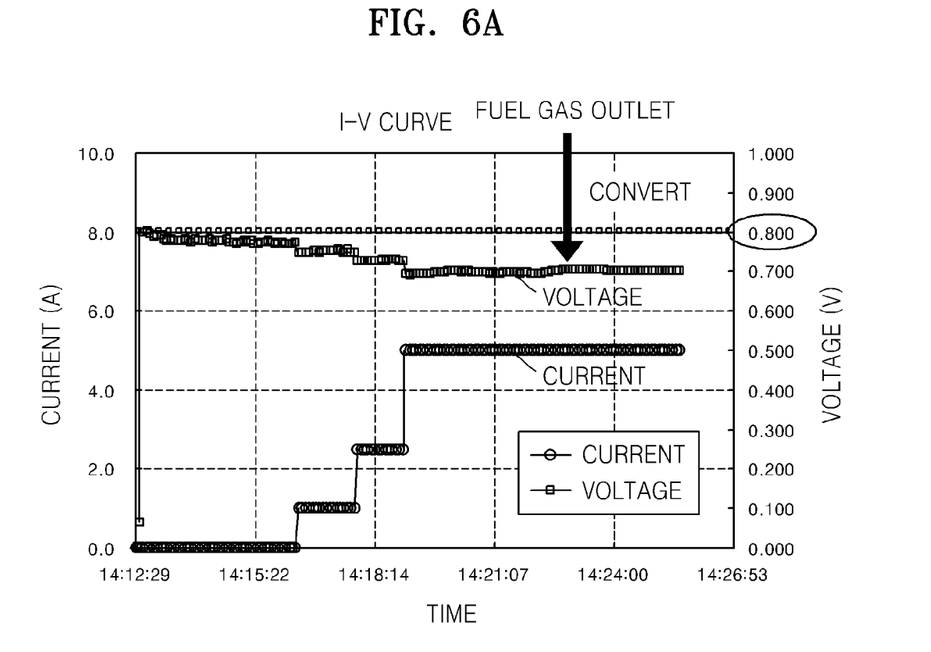
Figure 6B:
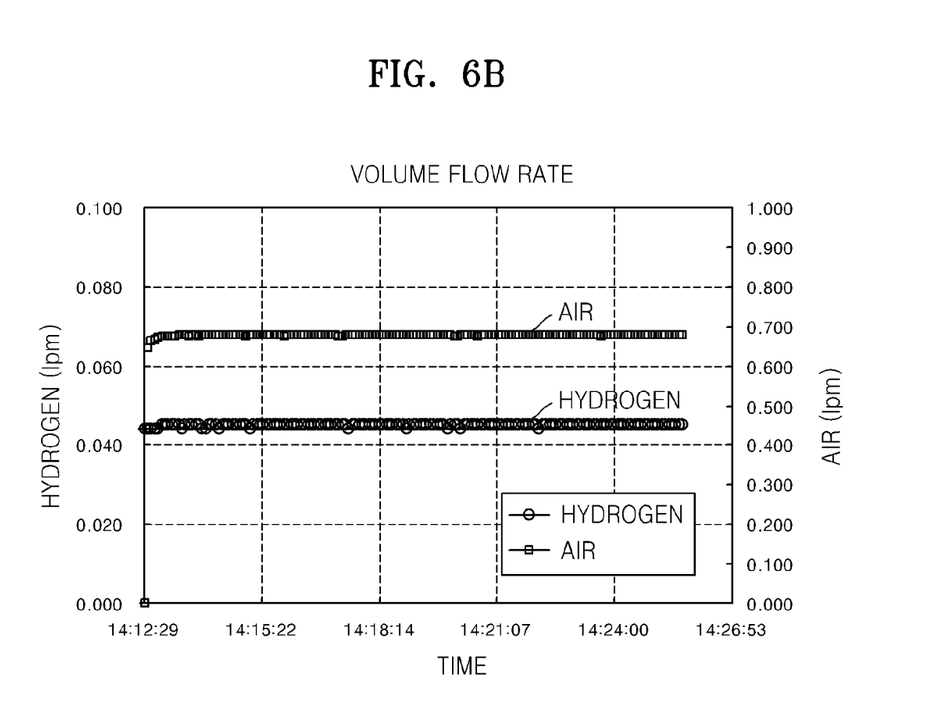

FIGS. 6A through 8A are graphs showing OCVs, according to the concentration of a fuel gas supplied to the fuel cell system 100, and FIGS. 6B through 8B are graphs showing the amount of air and a fuel gas supplied, i.e., hydrogen, in each case. In the conventional fuel cell system of FIGS. 5A and 5B, and the fuel cell system of FIGS. 6A through 8A, the areas of the stacks and the amount of air supplied to a cathode side are the same. The only difference is that the fuel cell system of FIGS. 6A through 8A adjusts the amount of fuel gas supplied. Referring to FIG. 6A, in the start-up mode, an OCV does not reach 0.9 V but is maintained at about 0.8 V. After the fuel cell system operates with a given load for a given amount of time, even though supply of the fuel gas to the cathode side is cut off, the stack is maintained at a uniform voltage (i.e., about 0.7 V).

Figure 7A:
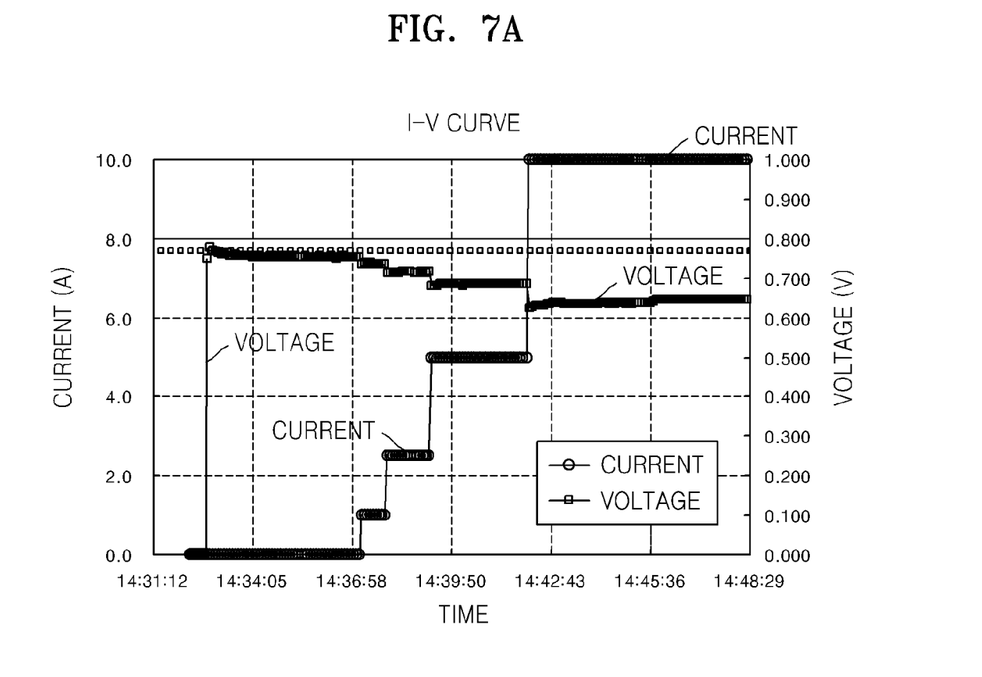
Figure 7B:
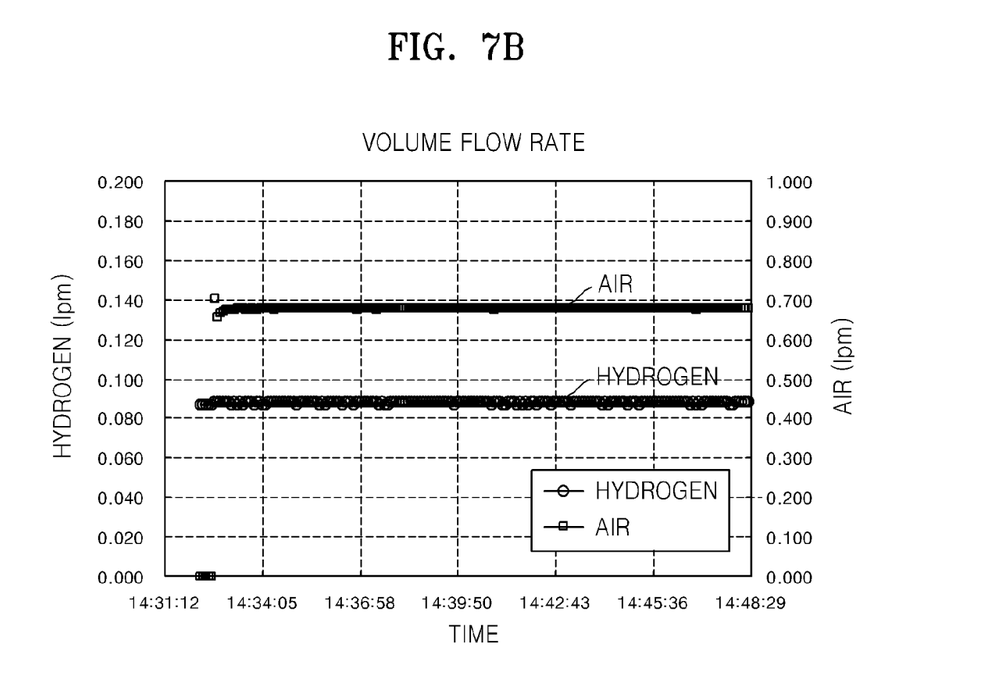
Figure 8A:
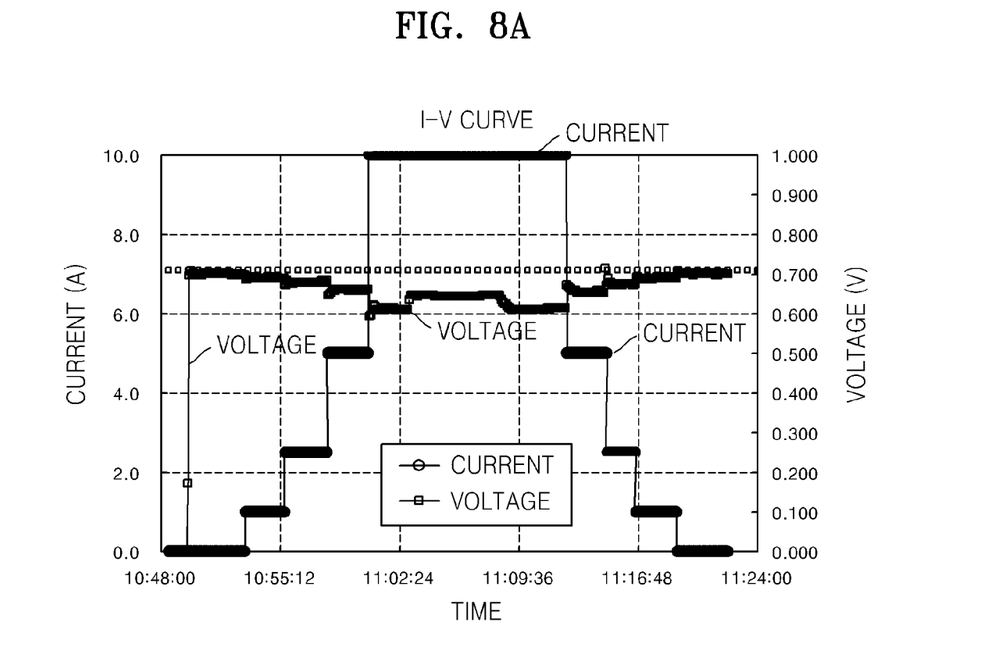
Figure 8B:
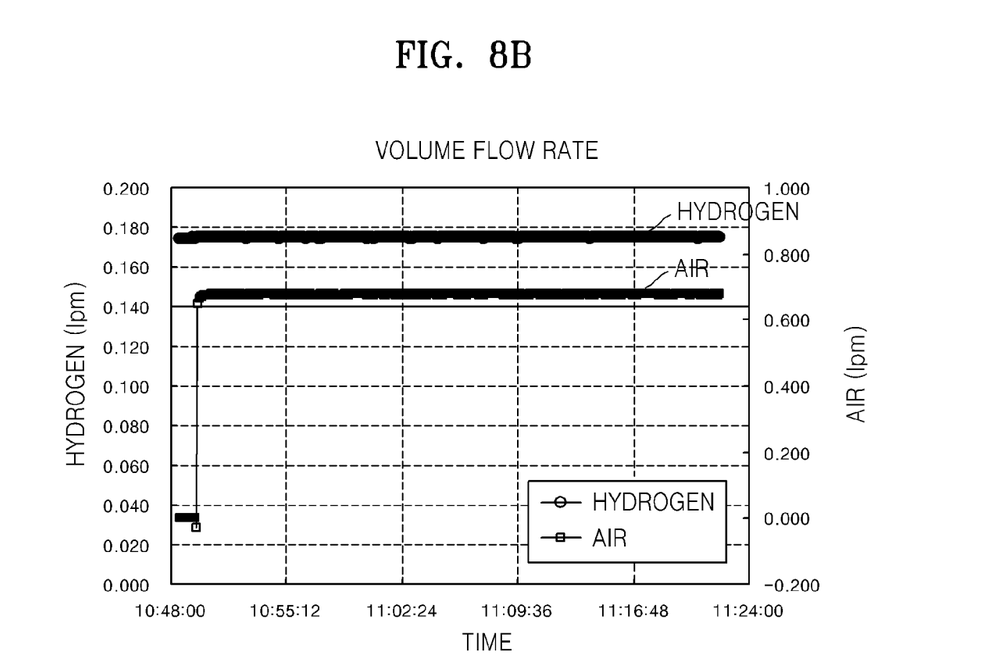

Referring to FIG. 7A, concentration of the supplied fuel gas is increased two fold, as compared to that of FIG. 6A. As such, the OCV is slightly decreased to 0.76 V. Referring to FIG. 8A, concentration of the supplied fuel gas is increased four fold, as compared to FIG. 6A. As such, the OCV is further decreased to 0.7 V. In particular, referring to FIG. 8A, the area of the stack, concentration of the fuel gas, the concentration of the air, and an average operating temperature are set to be the same as those of FIG. 5A. As such, an OCV of 0.7 V may be generated, even in the shut-down mode.

As described above, according to the one or more of the above exemplary embodiments, a low OCV may be maintained in a start-up mode and in a shut-down mode, and a fuel cell system according to the present teachings may operate with a load, while the low OCV is maintained, so that the range of voltages output from a stack in an operating mode, a start-up mode, a normal mode, and a shut-down mode may be reduced. Therefore, a stable operation of a PCS, to which a DC output from the stack is input, may be guaranteed.

Also, a low OCV that is used to determine a maximum voltage output from the stack may be maintained, so that the capacity of the PCS may be reduced and damage to catalyst of the cathode may be prevented.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:
1. An apparatus to control an open circuit voltage (OCV) of a fuel cell stack having an anode side and a cathode side, the apparatus comprising:
   a first valve installed at an outlet of the anode side, to control the flow of anode off-gas to an inlet of the cathode side, to control the flow of anode off-gas to an inlet of a burner to heat the stack, and to adjust the internal pressure in the anode side;
   a second valve installed between an outlet of the first valve and the inlet of the cathode side; and
   a control unit configured to control the first valve, so as to:

mix the anode off-gas with air that is supplied to the cathode side while increasing the internal pressure in the anode side by partially closing the first valve to restrict the anode off-gas discharged from the anode side, during a start-up mode or a shut-down mode, while the stack is in an OCV state, and cut off the supply of the anode off-gas to the cathode, during a normal operating mode.

2. The apparatus of claim 1, wherein the anode off-gas includes hydrogen or a reformate gas.

3. The apparatus of claim 1, wherein the second valve includes a check valve that is automatically opened, if a gas pressure is applied to the second valve.

4. The apparatus of claim 1, wherein the control unit is further configured to control at least one of the first valve and the second valve during the start-up mode and in the shut-down mode, while the stack is in an OCV state, to adjust an amount of the anode off-gas that is supplied to the cathode side.

5. An apparatus to control an open circuit voltage (OCV) of a fuel cell stack having a cathode side and an anode side, the apparatus comprising:

a first valve installed at an outlet of the anode side, to adjust an internal pressure in the anode side;

a second valve and a third valve connected in series, between an inlet of the anode side and an inlet of the cathode side; and a control unit configured to control the first valve and the third valve, so as to:

increase the internal pressure in the anode side by partially closing the first valve to restrict anode off-gas discharged from the anode side, while supplying a fuel gas to the cathode side, during a start-up mode and a shut-down mode, when the stack is in an OCV state, and cut off supply of the fuel gas to the cathode side, when the stack is in a normal operating mode.

6. The apparatus of claim 5, wherein the fuel gas includes hydrogen or a reformate gas.

7. The apparatus of claim 5, wherein the second valve includes a check valve that is automatically opened, to prevent back flow of the fuel gas and air from the cathode side.

8. The apparatus of claim 5, wherein the control unit is further configured to control the first through third valves, during the start-up mode and in the shut-down mode, to adjust an amount of the fuel gas that is mixed with air that is supplied to the cathode side.

9. A fuel cell system, comprising:

a fuel cell stack having a cathode side and an anode side, to generate a direct current (DC);

an operating module to control an open circuit voltage (OCV) of the stack by supplying a fuel gas and air to the cathode side at the same time, while increasing an internal pressure in the anode side by restricting anode off-gas discharged from the anode side, during a start-up mode and a shut-down mode, when the stack is in an OCV state; and a power conditioning system (PCS) to generate an alternating current (AC) from the DC.

10. The system of claim 9, wherein the operating module reduces the dynamic range of the DC supplied to the PCS.

11. The system of claim 9, wherein the operating module includes:

a first valve installed between an outlet of the anode side and an inlet of the cathode side, or an inlet of a burner;

a second valve installed between an outlet of the first valve and the inlet of the cathode side; and a control unit to control the first valve and the second valve, to adjust an amount of the fuel gas that is supplied to the cathode side and to adjust the internal pressure in the anode side, during the start-up mode and in the shut-down mode, and to prevent the fuel gas from being supplied to the cathode side, during the normal operating mode.

12. The system of claim 9, wherein the operating module includes:

a first valve installed at an outlet of the anode side;

a second valve and a third valve connected in series, between an inlet of the anode side and an inlet of the cathode side; and a control unit to control the first valve and the third valve, to control an amount of the fuel gas that is supplied to the cathode side and to adjust the internal pressure in the anode side, during the start-up mode and the shut-down mode, and to cut off supply of the fuel gas to the cathode side during the normal operating mode.

13. The system of claim 9, wherein the OCV is varied in each OCV state in the start-up mode and in the shut-down mode by adjusting a concentration of the fuel gas in the air that is supplied to the cathode side.

14. A method of operating a fuel cell system comprising a fuel cell stack having a cathode side and an anode side, the method comprising:

supplying fuel gas and air to the cathode side at the same time, while increasing an internal pressure in the anode side by restricting anode off-gas discharged from the anode side, during a start-up mode, when the stack is in an open circuit voltage (OCV) state;

cutting off the supply of the fuel gas to the cathode side during a normal operating mode;

supplying the fuel gas and the air to the cathode side at the same time, while increasing the internal pressure in the anode side by restricting anode off-gas discharged from the anode side, during a shut-down mode, when the stack is in an OCV state; and purging the stack when the stack is in the OCV state.

15. The method of claim 14, wherein the OCV is varied in the start-up mode and in the shut-down mode, by adjusting relative concentrations of the fuel gas and the air supplied to the cathode side.

16. The apparatus of claim 1, wherein:

the control unit further controls the first valve, so as to mix the anode off-gas with the air that is supplied to the cathode side, during an initial load state or an end load state;

the initial load state is a time, prior to the normal operating mode, when the fuel cell stack supplies power to a load;

the end load state is a time, after the normal operating mode, when the fuel cell stack supplies power to the load; and during the normal operating mode, the fuel cell stack supplies power to the load.

17. The apparatus of claim 5, wherein:

the control unit further controls the first valve and the third valve, so as to increase the internal pressure in the anode side while supplying the fuel gas to the cathode side, during an initial load state and an end load state;

the initial load state is a time, prior to the normal operating mode, when the fuel cell stack supplies power to a load;

the end load state is a time, after the normal operating mode, when the fuel cell stack supplies power to the load; and during the normal operating mode, the fuel cell stack supplies power to the load.

18. The system of claim 9, wherein:
the operating module is further to supply the fuel gas and the air to the cathode side at the same time, during an initial load state and an end load state;
the initial load state is a time, prior to a normal operating mode, when the fuel cell stack supplies power to a load;
the end load state is a time, after the normal operating mode, when the fuel cell stack supplies power to the load; and
during the normal operating mode, the fuel cell stack supplies power to the load.

19. The method of claim 14, further comprising supplying the fuel gas and the air to the cathode side at the same time, during an initial load state and an end load state, wherein:
the initial load state is a time, prior to the normal operating mode, when the fuel cell stack supplies power to a load;
the end load state is a time, after the normal operating mode, when the fuel cell stack supplies power to the load; and
during the normal operating mode, the fuel cell stack supplies power to the load.

\* \* \* \* \*